(12) United States Patent
Lindholm et al.

(10) Patent No.: US 6,512,825 B1
(45) Date of Patent: Jan. 28, 2003

(54) QUEUE-BASED DISTINCTIVE RINGING IN A CALL CENTER SYSTEM

(75) Inventors: Jeffrey J. Lindholm, Carmel, IN (US); Michael D. Gagle, Lafayette, IN (US); Michael D. Synder, Noblesville, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 361 days.

(21) Appl. No.: 09/615,195

(22) Filed: Jul. 13, 2000

Related U.S. Application Data

(60) Provisional application No. 60/143,460, filed on Jul. 13, 1999, and provisional application No. 60/186,487, filed on Mar. 2, 2000.

(51) Int. Cl.[7] .......................... H04M 3/42; H04M 3/523
(52) U.S. Cl. ........................... 379/266.01; 379/207.16; 379/265.12; 379/265.13; 379/373.02; 379/911
(58) Field of Search ..................... 379/265.01, 265.02, 379/265.11, 265.12, 265.13, 265.14, 266.01, 266.02, 266.03, 911, 207.16, 252, 373.01, 373.02, 373.03, 373.04

(56) References Cited

U.S. PATENT DOCUMENTS

| | | | |
|---|---|---|---|
| 4,277,649 A | * 7/1981 | Sheinbein | 379/197 |
| 4,449,017 A | 5/1984 | Burke et al. | 379/373.02 |
| 4,451,705 A | 5/1984 | Burke et al. | 379/265.11 |
| 4,975,940 A | 12/1990 | Hashimoto | 379/67.1 |
| 5,185,782 A | * 2/1993 | Srinivasan | 379/207.03 |
| 5,200,992 A | 4/1993 | Yoshino | 379/93.01 |
| 5,442,692 A | 8/1995 | Yamazaki et al. | 379/253 |
| 5,574,977 A | * 11/1996 | Joseph et al. | 455/450 |
| 5,828,742 A | 10/1998 | Khalid et al. | 379/199 |
| 5,898,767 A | 4/1999 | Cave | 379/211.03 |
| 6,141,328 A | * 10/2000 | Nabkel et al. | 370/259 |
| 6,215,859 B1 | * 4/2001 | Hanson | 379/88.12 |

* cited by examiner

*Primary Examiner*—Harry S. Hong
(74) *Attorney, Agent, or Firm*—Woodard, Emhardt, Naughton, Moriarty & McNett

(57) ABSTRACT

A novel communication distribution system is provided. In one form, an automatic communication distributor manages multiple queues of calls waiting to be handled by agents. When a call is transferred to an agent's workstation, the workstation provides different ringing signals to the agent based on the automatic communication distributor queue from which the call is coming. In another form, a computer-readable medium is encoded with programming instructions that are executable by a processor to differentiate between calls coming from different ACD queues, and to provide different ringing signals to a user based on that differentiation.

18 Claims, 2 Drawing Sheets

QUEUE-BASED DISTINCTIVE RINGING IN A CALL CENTER SYSTEM

REFERENCE TO RELATED APPLICATIONS

Priority is claimed to U.S. Provisional Patent Application No. 60/143,460, filed Jul. 13, 1999 and to U.S. Provisional Patent Application No. 60/186,487, filed Mar. 2, 2000.

BACKGROUND

The present invention relates to call centers, and more particularly, but not exclusively, relates to distinctive ringing of calls at a workstation in a call center.

In a call center, a call center agent typically communicates with customers through in-bound calls, out-bound calls, or both. This communication is often by voice using a telephone handset or headset component of the agent's workstation. Usually, the workstation also includes a computer terminal or personal computer to interface with various application modules. These modules provide the agent information directed to the particular customer service involved. In one common application, a customer's account information is provided on a display viewable by the agent.

In some call centers, one or more agents may be able to handle calls of more than one type. For example, an agent may be able to take orders for products and be able to answer questions from customers who need to return defective products. Some such call center systems accept incoming telephone calls for different telephone numbers depending on the purpose of the call (i.e., a customer dials one telephone number for orders and another telephone number for returns), or the customer dials a single number and navigates an interactive voice response (IVR) system to indicate the nature of the call. In either type of system, the call center system in some embodiments maintains separate queues for calls of different types. Adding to the example above, there may be a queue of customers waiting to place new orders and another queue of customers waiting to discuss merchandise returns. Some agents might be trained to handle only one type of call, but agents trained to handle multiple types of calls make the call center more efficient. There is, therefore, a need to facilitate the use of agents who handle multiple call types.

SUMMARY

One form of the present invention relates to an improved system and method for ringing calls at an agent's workstation in a call center. In other forms, distinctive ringing is applied to an agent's workstation based on the ACD queue from which the call is being sent. It is thus an object of the present invention to provide an improved call center communications system and method. It is another object of the present invention to provide one or more different ringing signals to a given agent, the signals being selected based on the call queue from which the call is being transferred.

Further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
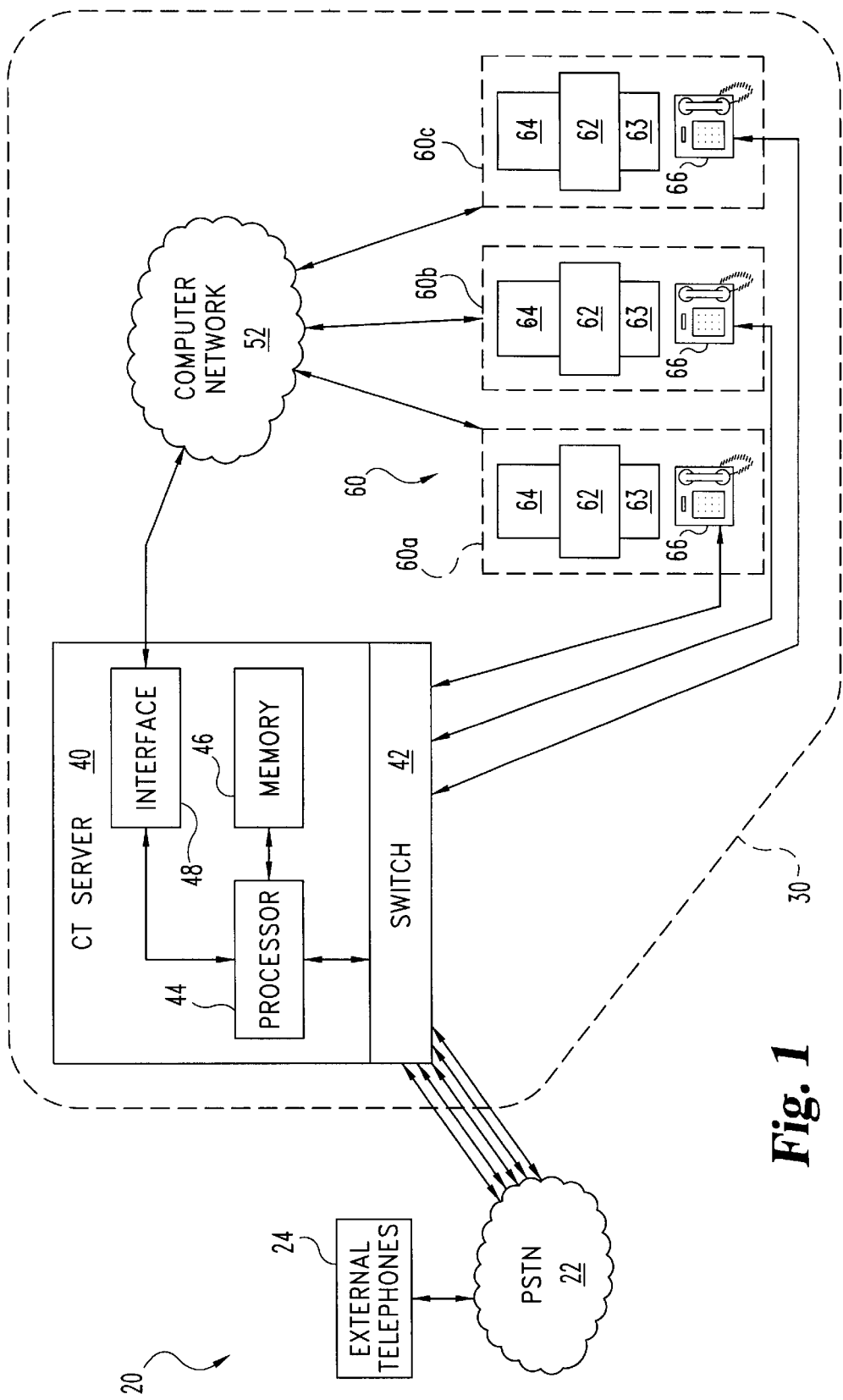
FIG. 1 is a schematic view of a system according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as claimed herein are contemplated as would normally occur to one skilled in the art to which the invention relates.

In the example embodiment to be discussed next, a call center accepts inbound and makes outbound telephone calls to and from customers and prospects (collectively "customers" herein) for an organization. The call center is equipped with both automatic call-handling equipment (e.g., an IVR system, voice mail system, and fax-back system) and live agents. A portion of the call center operation involves outbound calling of prospective customers, or customers whose accounts are overdue, for example. This function uses a predictive dialing unit to automatically attempt to dial these persons with minimal (if any) involvement by a live person. In some situations, a call may be connected to the appropriate customer, while no agent is available. In such situations, the call is queued by an automatic call distributor (ACD) until an agent is free to take the call.

Another portion of this example call center operation involves inbound calling by customers who, for example, wish to place orders, inquire about their accounts, and/or obtain authorization to return defective merchandise. The calls are received by the IVR system, which determines the type of call being made. The IVR system may also collect other information, such as account number, zip code, or other data that is relevant to the processing of the call, but can be entered without a human agent. The calls are then placed into a plurality of queues based on the type of call it is. As qualified agents become free from other work, the calls are transferred from the queues to the agents for processing.

FIG. 1 schematically illustrates call center system 20 of one embodiment of the present invention. System 20 includes Public Switched Telephone Network (PSTN) 22 operatively coupled to a number of external telephones 24 and call center 30. Call center 30 includes Computer Telephony (CT) server 40 with telecommunications switch 42 coupled to PSTN 22. Server 40 also includes processor 44, memory 46, and network interface 48. Network interface 48 is operatively coupled to computer network 52.

It should be understood that server 40 may include more than one processor or CPU and more than one type of memory; where memory 46 is representative of one or more types. Furthermore, it should be understood that while one server 40 is illustrated, more servers may be utilized in alternative embodiments. Processor 44 may be comprised of one or more components configured as a single unit. Alternatively, when of a multi-component form, processor 44 may have one or more components located remotely relative to the others. One or more components of processor 44 may be of the electronic variety defining digital circuitry, analog circuitry, or both. In one embodiment, processor 44 is of a conventional, integrated circuit microprocessor arrangement, such as one or more PENTIUM II or PENTIUM III processors supplied by INTEL Corporation of Santa Clara, Calif., U.S.A. For this embodiment, switch 42 can be in the form of one or more telephone communication processing boards provided by DIALOGIC Corporation of Parsippany, N.J., U.S.A.

Memory 46 may each include one or more types of solid-state electronic memory, magnetic memory, or optical memory, just to name a few. By way of non-limiting example, memory 46 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 46 may be volatile, nonvolatile, or a hybrid combination of volatile and nonvolatile varieties.

Network 52 may be in the form of a Local Area Network (LAN), Wide Area Network (WAN) such as the Internet, or other network type as would occur to those skilled in the art. Also coupled to network 52 are a number of agent workstation 60a, 60b, 60c (collectively or generically designated agent stations 60). Agent workstations each include workstation computer 62 coupled to display 64. Each workstation 60 may also include one or more operator input devices 63 (see FIG. 2) such as a keyboard, mouse, track ball, light pen, and/or microphone, to name just a few representative examples.

Also, besides display 64, one or more other output devices may be included such as audio output device(s) 69 and/or a printer (not shown). Audio output equipment 69 may comprise one or more loudspeakers, headphones, or other audio devices known in the art.

Storage unit 68 is encoded with instructions executable by processor 65 to implement the functionality of workstation 60a that is needed or desired. Storage unit 68 comprises one or more of the types of memory described above in relation to memory 67, and preferably comprises one or more non-volatile forms of that memory.

Each workstation 60 further includes a telephone unit 66 as schematically illustrated in FIG. 1. Telephone units 66 may be in the form of a handset, headset, or other arrangement as would occur to those skilled in the art. Workstations 60 may be arranged identically to one another or may differ from one to the next as would occur to those skilled in the art. In one common arrangement, one workstation is designated for an agent supervisor that has different capabilities than those of other workstations. Furthermore, it should be understood that more or fewer workstations may be utilized than those illustrated.

Under the control of CT server 40, switch 42 may be configured to operate in the form of a Private Branch Exchange (PBX), predictive dialer, Automatic Call Distributor (ACD), a combination of these, or another switching configuration as would occur to those skilled in the art. Alternatively or additionally, system 20 may be arranged to provide for the coordination, conversion, and distribution of a number of different forms of communication, such as telephone calls, voice mail, facsimile transmissions, e-mail, web chats, web call-backs, and the like. Furthermore, business/customer data associated with various communications may be stored in memory 46 and selectively accessed by one or more workstations 60. This data may be presented with a corresponding display 64.

Figure 2:
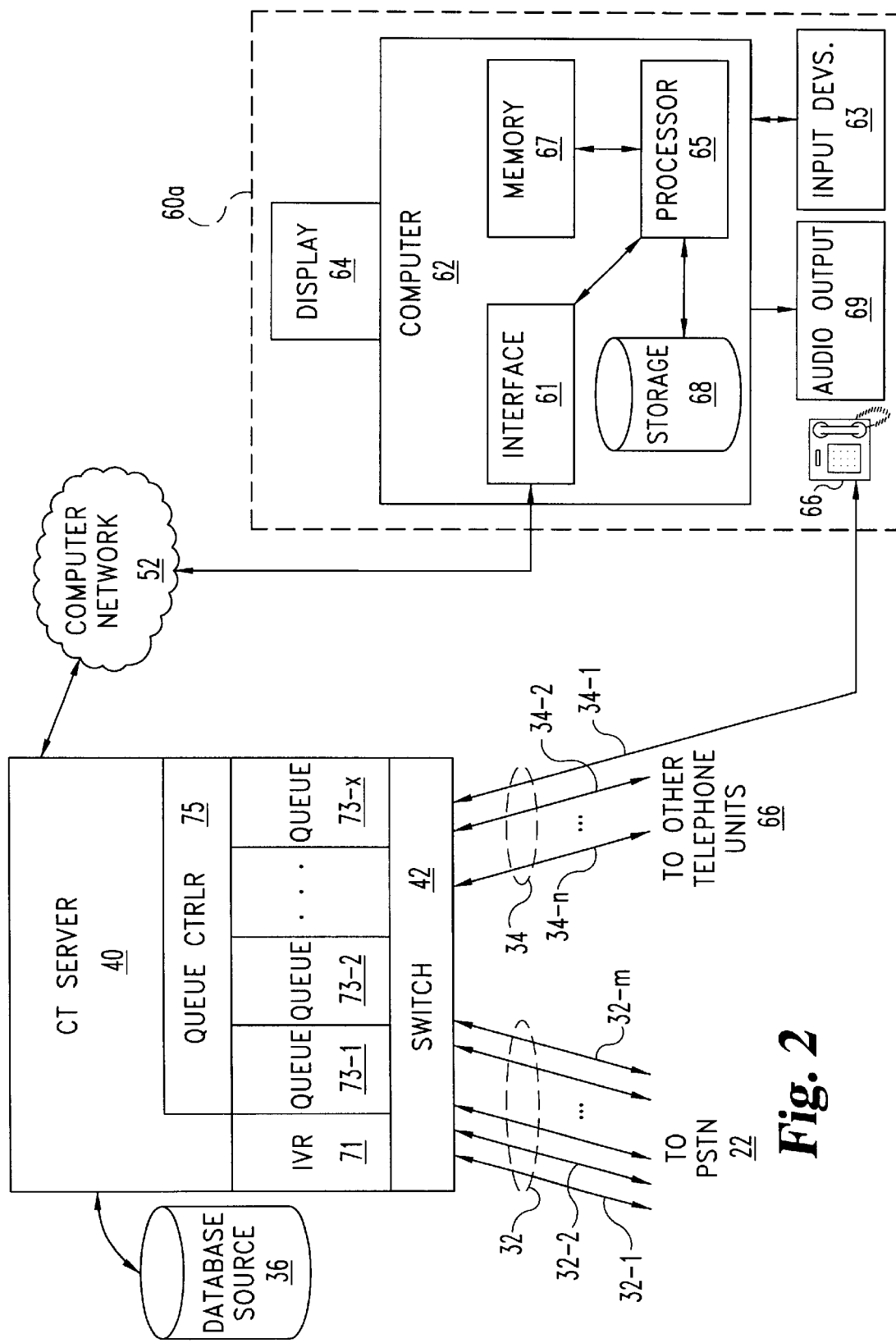
FIG. 2 is a functional block diagram of a communication server and an agent's workstation.

The functional aspects of CT server 40 and the interaction between CT server 40 and workstations 60 will now be described in further detail with reference to FIG. 2 and continuing reference to FIG. 1. Certain elements shown in FIG. 1 are also shown in FIG. 2 (using common reference numerals), while other components that are either implemented by, complementary to, or separate from the elements shown in FIG. 1 are given different reference numerals. FIG. 2 shows CT server 40 with several of its functional components in an example embodiment. In other embodiments of the present invention, other or additional components can be included within the scope of the present invention. In this example, CT server 40 includes switch 42, which is connected to PSTN 22 via external telephone lines 32-1, 32-2, . . . 32-m (collectively or generically designated external lines 32), and is connected to telephone units 66 in workstations 60 via internal telephone lines 34-1, 34-2, . . . 34-n (collectively designated internal lines 34). CT server 40 includes switch 42, IVR unit 71, queues 73-1, 73-2, . . . 73-x (collectively or generically queues 73), and queue controller 75. Each of these components may be implemented in hardware, software, or a combination of both.

In this exemplary embodiment customers make incoming calls to call center 30 using external telephones 24 via PSTN 22. The calls arrive on one of external lines 32 at switch 42 of CT server 40. Switch 42 connects the call to IVR unit 71, which accepts the call and collects information from the caller (using, for example, voice or DTMF input) to determine the nature of the call. Based on that determination, IVR unit 71 can collect additional information and provide additional responses (for example, account information from database source 36). For other types of calls, IVR unit 71 accepts a fax-back request, then forwards the information to a fax server (not shown) for processing. If it is determined that a particular call or type of call must be processed by an agent, the call is transferred to one of queues 73, the queue being selected by queue controller 75 based on the type of call being transferred.

It should be noted that any suitable method may be used to determine the type of call, and that determination may be made at any appropriate time. For example, a call center may take sales calls at a first telephone number and returned merchandise authorization requests at another telephone number. In that case, the nature of the call can be determined as the call is entering call center 30 (before it is even connected by switch 42 to its destination) based on/DNIS (dialed number identification system) information that is transmitted by PSTN 22 with the call as the call reaches switch 42.

In this exemplary embodiment, the transfer of calls to queues 73 is managed by queue controller 75. Queue controller 75 maintains communication with workstations 60 via computer network 52 in order to monitor the availability of agents at workstations 60. When an agent becomes available, queue controller 75 checks queues 73 for waiting calls. Queue controller 75 determines whether the agent is capable of handling any of the waiting calls (e.g., based on languages the agent knows, skills or training the agent has, or security permissions the agent has been given).

As discussed above, call center 30 can be made more efficient if at least some agents can handle more than one type of call. If this is the case, queue controller 75 might send an order-placement call to the agent at workstation 60a from queue 73-2. Later queue controller 75 might send an RMA request from queue 73-5 to the same agent. As each call is transferred from a queue 73 to workstation 60a over an internal line 34-i, CT server 40 transmits a ringing signal on internal line 34-i ahead of the call. The agent at workstation 60a can then choose to pick up or not pick up the call as desired.

In some embodiments of the present invention, when a call is being transferred from a queue 73 to a workstation 60, CT server 40 sends different ringing signals over the selected internal line 34, depending on the queue 73 from which the call is being transferred. In one example, CT server 40 applies three short ringing signals, then a pause to internal line 34. Telephone 66 at the selected workstation 60, therefore, provides three short rings of a bell or tone, and the agent at the selected workstation 60 can hear the signals and decide whether or not to answer. If, however, the call comes from another queue (for example, a "complaint line" queue), CT server 40 produces a signal, long ringing signal. When the signal reaches telephone unit 66 of the selected workstation 60, the telephone unit 66 emits a single, long ring. The agent at the selected workstation 60 can then decide whether or not to handle the "complaint line" call. In either case, the agent's decision to accept or reject the call is indicated to the system passively (e.g., by a period of inaction by the agent) or actively (e.g., by lifting the handset, pressing a button on an input device 63, or by speaking into the handset of telephone 66), as allowed by the system configuration.

In another example, CT server 40 sends a ringing signal to computer 62 over the computer network 52 with or ahead of the call being sent via internal line 34. The ringing signal contains data that indicates the queue 73 from which the call is being transferred. Computer 62 decodes this data and displays a message on display 64 to indicate that the call is coming in. This message identifies the queue from which the call is being transferred (based on the decoded data from the message). Computer 62 may additionally or alternatively play one or more audio tones through a speaker or handset of telephone 66 and/or audio output equipment 69.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only preferred embodiments have been shown and described and that all changes, equivalents, and modifications that come within the spirit of the inventions defined by the following claims are desired to be protected.

What is claimed is:

1. A system, comprising:
    an automatic communication distributor, comprising a first queue and a second queue; and
    a workstation, in communication with said automatic communication distributor, that is capable of generating each of a plurality of different ringing signals, said workstation comprising:
        a communication device; and
        a distinctive ringing means
            for generating a first one of said plurality of ringing signals in response to an attempt to connect a communication from said first queue with said communication device, and
            for generating a second one of said plurality of ringing signals in response to an attempt to connect a communication from said second queue with said communication device.

2. The system of claim 1, wherein one or more of said plurality of different ringing signals are recordings of spoken words.

3. The system of claim 2, wherein:
    said first ringing signal is a recording of a first set of spoken words, said first set of spoken words describing the type of communication that is placed in said first queue; and
    said second ringing signal is a recording of a second set of spoken words, said second set of spoken words describing the type of call that is placed in said second queue.

4. The system of claim 1, wherein said first queue handles a first form of communication, and said second queue handles a second type of communication.

5. The system of claim 4, wherein said first form of communication comprises a voice communication.

6. The system of claim 4, wherein said first form of communication comprises a text-based communication.

7. The system of claim 4, wherein said first form of communication comprises a video-based communication.

8. In a system comprising a plurality of queues for waiting calls, a method comprising:
    placing a first plurality of calls in a first queue;
    placing a second plurality of calls in a second queue;
    ringing the firs t plurality of calls at a communication device by producing a first ringing signal; and
    ringing the second plurality of calls at the communication device by producing a second ringing signal;
    wherein said first ringing signal and said second ringing signal are discernible and distinguishable by a human agent proximate to the communication device.

9. The method of claim 8, wherein the first ringing signal and the second ringing signal each comprise an audio signal.

10. The method of claim 9, wherein the audio signals are produced by a headset.

11. The method of claim 9, wherein the audio signals are produced by a telephone handset.

12. The method of claim 9, wherein the audio signals are produced by loudspeakers.

13. The method of claim 8,
    wherein the first ringing signal comprises a first video signal; and
    wherein the second ringing signal comprises a second video signal.

14. The method of claim 13, wherein the first video signal and the second video signal are each displayed by a computer monitor.

15. The method of claim 14, wherein:
    the first video signal forms text that describes the first queue, and the second video signal forms text that describes the second queue.

16. An apparatus, comprising:
    an automatic call distributor having a plurality of queues of waiting calls;
    a workstation, in communication with said automatic call distributor, comprising:
        a telephonic terminal; and
        a ringing means for producing each of a plurality of different ringing signals for signaling the presence of a call being connected to said terminal by said automatic call distributor;
    wherein, for each incoming call, said ringing means selects one of the plurality of ringing signals based on the one of said plurality of queues from which the incoming call is coming.

17. An apparatus, comprising:

an automatic call distributor having a first ACD queue and a second ACD queue;

a processor at a workstation, said processor being in communication with said automatic call distributor; and a computer-readable medium accessible by said processor and encoded with programming instructions, said programming instructions being executable by said processor to:

distinguish between calls ringing at a workstation from said first ACD queue and calls ringing at the workstation from said second ACD queue;

provide a first ringing signal that indicates that a call is ringing at the workstation from said first ACD queue; and provide a second ringing signal that indicates that a call is ringing at the workstation from said second ACD queue;

wherein the first ringing signal and the second ringing signal are detectable and distinguishable by a human operator at the workstation.

18. The apparatus of claim 17, further comprising:

state data related to each call; and a plurality of change messages from said automatic call distributor to the workstation, each said message indicating a change in said state data for one or more calls;

wherein said distinguishing uses said plurality of change messages.

* * * * *

UNITED STATES PATENT AND TRADEMARK OFFICE
CERTIFICATE OF CORRECTION

| | | |
|---|---|---|
| PATENT NO. | : 6,512,825 B1 | Page 1 of 1 |
| APPLICATION NO. | : 09/615195 | |
| DATED | : January 28, 2003 | |
| INVENTOR(S) | : Jeffrey J. Lindholm, Michael D. Gagle and Michael D. Snyder | |

It is certified that error appears in the above-identified patent and that said Letters Patent is hereby corrected as shown below:

Title page, item [75] Inventor "Michael D. Synder's" last name is misspelled on the first page under the listing of inventors. It is requested that his name be corrected to --Michael D. Snyder--.

Signed and Sealed this

Twenty-eighth Day of May, 2013

Teresa Stanek Rea
*Acting Director of the United States Patent and Trademark Office*